United States Patent [19]

Tanii

[11] Patent Number: 4,949,113
[45] Date of Patent: Aug. 14, 1990

[54] TOP COVER MOUNTING CONSTRUCTION FOR CAMERAS

[75] Inventor: Junichi Tanii, Osaka, Japan
[73] Assignee: Minolta Camera Kabushiki Kaisha, Osaka, Japan
[21] Appl. No.: 350,907
[22] Filed: May 12, 1989

[30] Foreign Application Priority Data

May 13, 1988 [JP] Japan ............................. 63-62253[U]

[51] Int. Cl.$^5$ ............................................. G03B 17/02
[52] U.S. Cl. ................................................. 354/288
[58] Field of Search ........................ 354/288, 152, 202

[56] References Cited

U.S. PATENT DOCUMENTS

| 2,467,320 | 4/1949 | Land ................................... 354/288 |
| 3,979,762 | 9/1976 | Hendry ............................... 354/288 |
| 4,390,263 | 6/1983 | Sumita ................................ 354/286 |

FOREIGN PATENT DOCUMENTS

| 55-18812 | 5/1980 | Japan . |
| 55-79324 | 5/1980 | Japan . |
| 55-149727 | 10/1980 | Japan . |
| 57-54133 | 3/1982 | Japan . |
| 58-128427 | 8/1983 | Japan . |
| 61-39397 | 11/1986 | Japan . |

OTHER PUBLICATIONS

Kabushiki Kaisha Nippon Camera-Sha Publication "Camera Annual'88", Published Dec. 15, 1987, pp. 8–10.

Primary Examiner—Brian W. Brown
Attorney, Agent, or Firm—Burns, Doane, Swecker & Mathis

[57] ABSTRACT

A top cover mounting construction for a camera includes a rearwardly bulged portion in an upper portion of a rear lid of the camera which is located on the side of a grip portion and a top cover having a bulged portion contiguous to the bulged portion of the rear lid. The top cover mounting constructon includes a set screw driven into the bottom surface of the bulged portion of the top cover through a screw insert aperture in a camera body portion under the bottom surface of the bulged portion. The set screw is completely concealed behind the rear lid and in the bulged portion of the top cover, and is easily accessible when the rear lid is opened or removed.

7 Claims, 2 Drawing Sheets

TOP COVER MOUNTING CONSTRUCTION FOR CAMERAS

BACKGROUND OF THE INVENTION

1. Field of the Invention

This invention relates to a top cover mounting construction for cameras.

2. Description of the Prior Art

Heretofore, screws have been mainly resorted to as fastening means in the field of cameras for detachably attaching a top cover to a camera body.

The screws which are employed as fastening means create a problem, however, when they are applied to the outer side of a top cover to fasten the same to a camera body. The appearance of the camera is impaired by the existance screw heads on the outer surfaces of the top cover. In order to overcome this problem, it has been the general practice (1) to bond concealing lids on screw heads set in sunken positions, (2) to bond the top cover to a camera body by the use of an adhesive, or (3) to provide hook portions on the top cover to thereby hold it fixedly in position on a camera body.

However, these conventional mounting constructions all have inherent drawbacks. Namely, the above-mentioned construction (1) additionally requires concealing lids which make the outer shape of a camera larger and take time for the removal of the lids; the construction (2) is insufficient in the degree of achieved and makes detachment of the top cover difficult due to the use of an adhesive; and the construction (3) is susceptible to loosening of the cover and often requires forceable wrenching of the top cover at the time of attachment and detachment.

Shown in FIG. 4 is an example of the conventional top cover mounting construction which uses screws to fix the top cover on a camera body and, specifically, in which the top cover is fixed by screws at a right end portion near a right-hand grip portion. In this figure, indicated at 1 is a top cover of a camera, at 2 is a front grip portion to be gripped by an operator by his right-hand fingers except his thumb, at 3 is a suspender ring to which a strap of the camera is to be connected, and at 4 and 5 are set screws which are tightened into the camera body from the upper and lateral sides of the top cover 1, respectively. Normally, instead of using the set screws 4 and 5 concurrently, one of these screws is used for this part of the top cover, other parts of the top cover being fixed by known fixing means.

Since the top cover is the most conspicuous part in the appearance of a camera, the set screw which is applied to the upper side of the top cover impairs the appearance of the camera to a considerable degree. Other conventional means which are added to improve the appearance have inherent drawbacks as mentioned hereinbefore.

Summary of the Invention

It is an object of the present invention to provide means which can eliminate the above-mentioned problems or drawbacks, and more particularly it is an object to provide a novel and useful top cover fixation means by locating a set screw in a concealed position behind a bulged thumb-retaining portion which is formed in the top cover.

In accordance with the present invention, the above-mentioned objectives are achieved by a top cover mounting construction for a camera having a rearwardly bulged retaining portion formed in an upper portion of a rear lid of the camera on the side of a grip, a bulged retaining portion formed in the top cover of the camera contiguously to the bulged retaining portion of the rear lid, and a set screw applied to the bottom surface of the bulged retaining portion of the top cover through a camera body portion to fix the top cover in position on the camera body.

With the above-described construction of the invention, after opening or removing the rear lid of a camera, one can fix the top cover on the camera body by applying a set screw into the bottom surface of the bulged retaining portion of the top cover through a camera body portion. The applied set screw is completely concealed in the bulged retaining portion of the rear lid, so it cannot be viewed from outside but can be screwed on or off extremely easily.

The above and other objects, features and advantages of the invention will become apparent from the following description and the appended claims, taken in conjunction with the accompanying drawings which show by way of example a preferred embodiment of the invention.

Description of Preferred Embodiment

Figure 1:
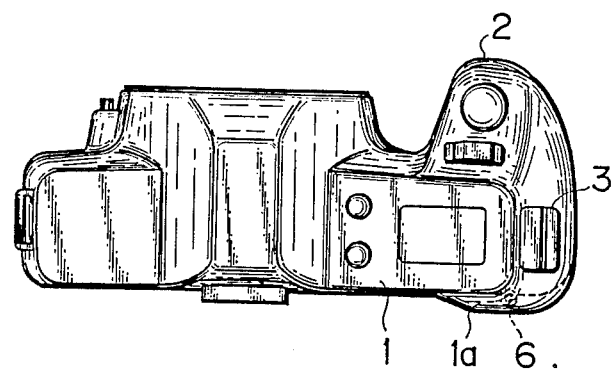
FIG. 1 is a schematic top view of a camera incorporating the top cover mounting construction of the present invention.
Figure 2:
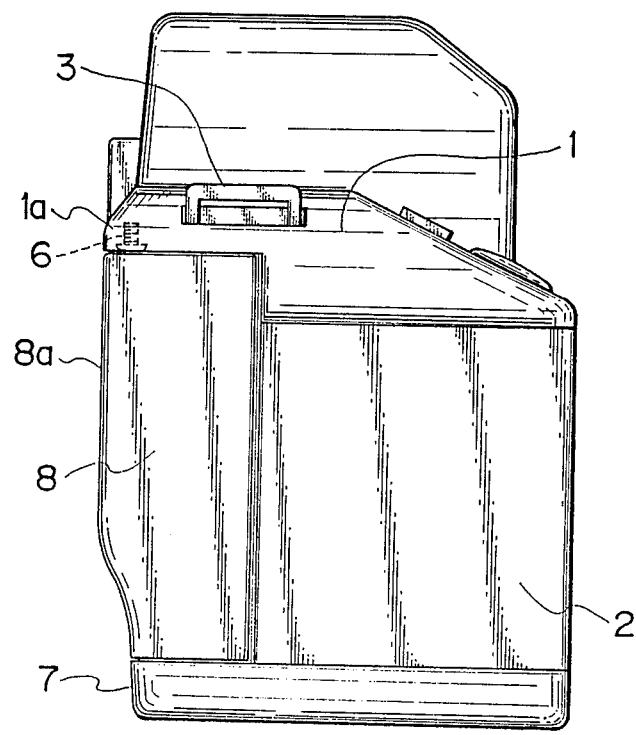
FIG. 2 is a side view of the camera of FIG. 1 as seen from the side of a right-hand grip.
Figure 3:
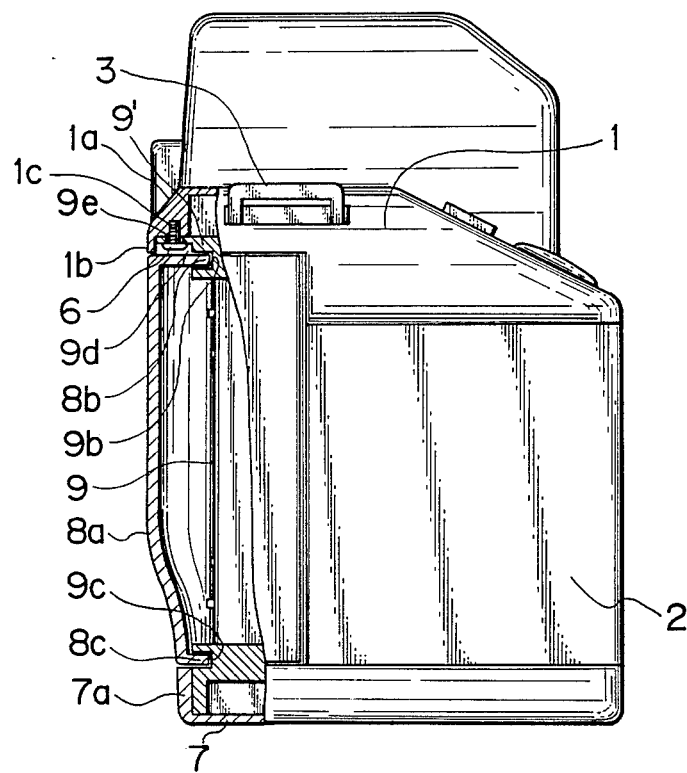
FIG. 3 is a partly cutaway side view of the camera including a set screw according to the invention.
Figure 4:
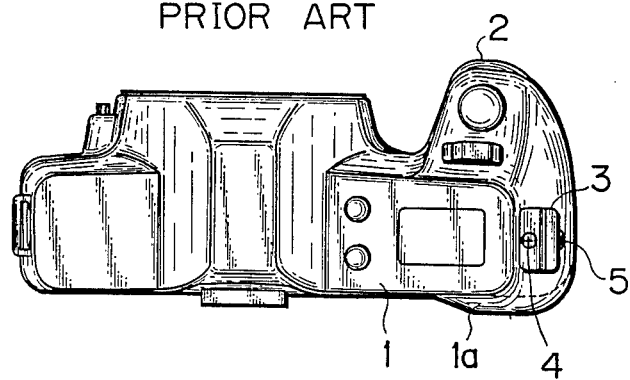
FIG. 4 is a view similar to FIG. 1 but showing the conventional location of a set screw on the top cover.

Referring to FIGS. 1 to 3, there is shown a camera employing the top cover mounting construction according to the invention, which includes a top 1, a front grip 2 on which an operator's right-hand fingers except the thumb are positioned, a suspender rings for connecting a strap, a set screw 6 at a bottom cover 7, and a rear lid 8.

Mainly for the purpose of improving grip an operator thumb, the upper portion of the rear lid 8 is bulged out rearwardly as indicated at 8a, while a top cover portion which is located above the rearward bulge 8a of the rear lid 8 is similarly bulged out as indicated at 1a to form a general contour continuous from said rearward bulge of the top cover. The rearward bulge 8a of the rear lid is tapered downwardly such that the degree of bulging diminishes to zero where the lower end meets the bottom cover 7 (FIG. 2).

As seen in FIG. 2, the bottom side of the rearward bulge 1a of the top cover 1 is accessible and viewable from its underside when the rear lid 8 is opened or removed. One can therefore screw the set screw 6 to the bottom surface of the bulged portion 1a to fix the bulged portion 1a to a rearward extension 9' of the camera body 9 as shown in FIG. 3. Conversely, when the rear lid 8 is in a closed state as shown in FIG. 2, the set screw cannot be seen from outside of the camera.

FIG. 3 more particularly shows the construction where the top cover 1 is secured to the rearward extension 9' of the camera body 9 by the set screw 6 screwed into the rearward bulge 1a. Said body 9 is integrally formed with the rearward extension 9' though the latter may be replaced with a separate member.

Indicated at 8b and 8c are light shielding walls which engage in complementary light shielding grooves 9b and 9c, respectively, on the camera body 9 to form light shielding portions together with the latter. Denoted at 9d is a recess which is formed in the rearward extension 9' of the camera body 9 to receive the head portion of the set screw 6, thereby keeping the head portion out of interference with the light shielding wall 8b when the rear lid 8 is opened and closed. Designated at 9e is a screw insert aperture formed in said rearward extension 9' of the camera body 9 for receiving the set screw 6 to be screwed into a threaded hole 1c of the rearward bulge 1a. At 1b is a pendent wall portion formed at the bulged rear end of the top cover 1, and at 7a is a riser wall portion formed at the end of the bottom cover 7.

As is clear from FIG. 3, the top cover 1 is attached to the camera body 9 by screwing the set screw 6 into the bottom wall of the rearward bulge 1a through the screw insert aperture 9e in the rearward extension 9'. The rearward extension 9' is located under the rearward bulge 1a of the top cover 1 and above the light shielding wall 8b on the upper side of the rearward bulge portion 8a of the rear lid 8.

In this instance, the head portion of the set screw 6 is positioned within the recess 9d on the camera body and is therefore kept from interference with the light shielding wall 8b of the rear lid 8.

After opening or removing the rear lid 8, the set screw 6 can be applied or removed easily with a screwdriver since the screw position in the threaded hole 1c or the head portion of the set screw 6 in the applied position can be reached from beneath. Besides, when the top and bottom covers are attached or detached to or from the camera body, normally the top cover 1 is attached on the camera body prior to the bottom cover 7, or the top cover 1 is detached from the camera body 9 after bottom cover 7. It follows that the lower cover 7 or the riser wall portion 7a is not attached to the camera body 9 when the set screw is normally loosened or tightened and the bottom wall portion of the rearward bulge 1a is therefore easily accessible for attachment or removal of the set screw 6.

In the particular embodiment shown, the length or degree of rearward bulging of the respective bulges 1a and 8a of the top cover 1 and the rear lid 8 is greater than the diameter of the head of the set screw 6. However, in a case where the degree of the rearward bulging is smaller than the diameter of the screw head, the set screw 6 can be mounted by forming the light shielding grooves 9b and 9c and the recess 9d in receded positions on the camera body 9. Further, instead of or in addition to the bulged portion on the right-hand side of the camera, the top cover may be provided with a bulged portion on the left-hand side of the camera if desired. Another set screw is simply provided on the bulged portion to fix the top cover in position in a similar manner. Also, this top cover mounting construction is applicable to other covers to be attached to a camera body.

As described hereinbefore, the set screw in the embodiment of the invention shown is located on the inner side of the bulged portion, which is provided on the top cover to provide a thumb grip. When the rear lid is closed, the set screw is completely concealed in or behind the rearward bulge 8a of the rear lid 8, the light shielding wall 8b and the pendent wall 1b of the top cover 1, and it thus cannot be seen from outside the camera although it can be screwed on or off very easily.

Thus, the top cover mounting construction of the invention permits placement of the set screw for the top cover in a concealed position to improve the appearance of the camera without necessitating a cover for the screw head itself. Additionally, attachment and detachment of the top cover is made easy, and the top cover is held securely in position.

What is claimed is:

1. A camera comprising:
   a camera body having a rearward extension extending therefrom, said rearward extension including a first hole therethrough;
   a rear lid of said camera body including a rearward bulge which forms a contour generally continuous with said rearward extension when attached to said camera body;
   a top cover of said camera body including a rearward bulge which forms a contour generally continuous with said rearward extension of the camera body and said rearward bulge of the rear lid when attached to said camera body, said rearward bulge of the top cover having a bottom surface, said bottom surface facing said rearward extension of the camera body and having a second hole therein; and
   a screw for fastening said bottom surface of said top cover rearward bulge to said rearward extension of the camera body, said screw being screwed upwardly through said first hole of said rearward extension into said second hole of the bottom surface of said top cover rearward bulge; whereby said rear lid rearward bulge denies access to said screw when said rear lid is closed and allows access to said screw when said rear lid is opened or removed.

2. A camera according to claim 1, wherein said rearward extension of the camera body includes a recess in which to receive a head of said screw.

3. A camera according to claim 2, wherein said top cover rearward bulge includes a pendent wall at a rear end portion thereof and said rear lid includes light shielding walls at respective upper and lower ends thereof, said screw head being completely enclosed within said recess by said rearward extension, said pendent wall and said upper light shielding wall when said rear lid is closed.

4. A camera comprising:
   a camera body having a rearward extension extending therefrom, said rearward extension including a first hole therethrough;
   a rear lid of said camera body including a rearward bulge which forms a contour generally continuous with said rearward extension when attached to said camera body;
   a top cover of said camera body including a rearward bulge which forms a contour generally continuous with said rearward extension of said camera body and said rearward bulge of said rear lid when attached to said camera body, said rearward bulge of the top cover having a bottom surface, said bottom surface facing said rearward extension of the camera body and having a second hole therein; and
   a screw for fastening said bottom surface of said top cover rearward bulge to said rearward extension of the camera body, said screw extending upwardly through said first hole of said rearward extension into said second hole in said bottom surface of the top cover rearward bulge; said screw being unobservable from the outside of the camera when said rear lid is closed and being observable from the outside of said camera when said rear lid is opened or removed.

5. A camera according to claim 4, wherein said rearward extension of the camera body includes a recess in which to receive a head of said screw.

6. A camera according to claim 5, wherein said top cover rearward bulge includes a pendent wall overhanging said rearward extension of the camera body and said rear lid includes a light shielding wall which is located underneath said rearward extension of the camera body when said rear lid is closed, said screw head being completely enclosed within said recess by said rearward extension, said pendent wall, and said light shielding wall when said rear lid is closed.

7. A camera comprising:

a camera body including a rearward extension extending therefrom, said rearward extension including a first hole;

a rear lid of said camera body including a rearward bulge;

a top cover of said camera body including a rearward bulge which includes a second hole, said top cover rearward bulge and said camera body rearward extension being adjacent each other and forming a contour generally continuous with said rear lid rearward bulge when said rear lid and said top cover are attached to said camera body; and a screw for fastening said top cover rearward bulge to said camera body rearward extension, said screw extending upwardly into said first and second holes with a head of said screw pointing downwardly; said screw being unobservable from the outside of the camera when said rear lid is closed and being observable from the outside of the camera when said rear lid is opened or removed.

* * * * *